United States Patent [19]
Rosenzweig et al.

[11] Patent Number: 5,915,096
[45] Date of Patent: Jun. 22, 1999

[54] NETWORK BROWSING SYSTEM AND METHOD

[75] Inventors: Philip M. Rosenzweig, Acton; Joseph E. Provino, Cambridge, both of Mass.

[73] Assignee: Sun Microsystems, Inc., Palo Alto, Calif.

[21] Appl. No.: 08/657,872

[22] Filed: May 31, 1996

[51] Int. Cl.$^6$ .............................. G06F 13/38; G06F 15/17
[52] U.S. Cl. ................................ 395/200.57; 395/200.53; 395/200.48; 395/200.75
[58] Field of Search ......................... 395/200.53, 500.55, 395/200.56, 200.57, 200.59, 200.47, 200.48, 200.75; 345/356, 326

[56] References Cited

U.S. PATENT DOCUMENTS

| | | | |
|---|---|---|---|
| 5,475,819 | 12/1995 | Miller et al. | 395/200.03 |
| 5,500,929 | 3/1996 | Dickinson | 395/160 |
| 5,621,734 | 4/1997 | Mann et al. | 370/94.1 |
| 5,625,781 | 4/1997 | Cline et al. | 395/335 |
| 5,664,170 | 9/1997 | Taylor | 395/200.5 |
| 5,687,320 | 11/1997 | Wiley et al. | 395/200.16 |
| 5,715,395 | 2/1998 | Brabson et al. | 395/200.13 |
| 5,724,506 | 3/1998 | Cleron et al. | 395/200.01 |

OTHER PUBLICATIONS

Browsing and Windows 95 Networking: Part I, Microsoft Coproration, 1996.
HTTP Working Group Internet Draft –Hypertext Transfer protocol—HTTP/1.1, Jan. 19, 1996.
Brown, Using Netscape 2, Que Publishing, pp. 18–30, 590–597, 1995.

*Primary Examiner*—Mark H. Rinehart
*Attorney, Agent, or Firm*—Richard A. Jordan

[57] ABSTRACT

A network browser system facilitates browsing of resources in a network, each of the resources having a respective network address. The network browser system includes a browsing control list and a browsing computer. The browsing control list includes at least one network specifier entry that identifies at least a portion of the network, the portion having associated therewith a range of network addresses. The browsing computer is responsive to a browsing request from an operator to initiate a browsing operation in connection with the network. During the browsing operation, the browsing computer generates, from the network specifier entry in the browsing control list, a plurality of browsing request messages that are associated with respective ones of the network addresses in the network address range, and transmits the browsing request messages over the network. The resources in a network whose network addresses correspond to network addresses in the transmitted browsing request messages receive the respective browsing request messages, and transmit in response browsing response messages to the browsing computer. Each browsing response message includes browsing information, such as a name or other textual identifier for the resource, which the browsing computer can display to the operator.

41 Claims, 7 Drawing Sheets

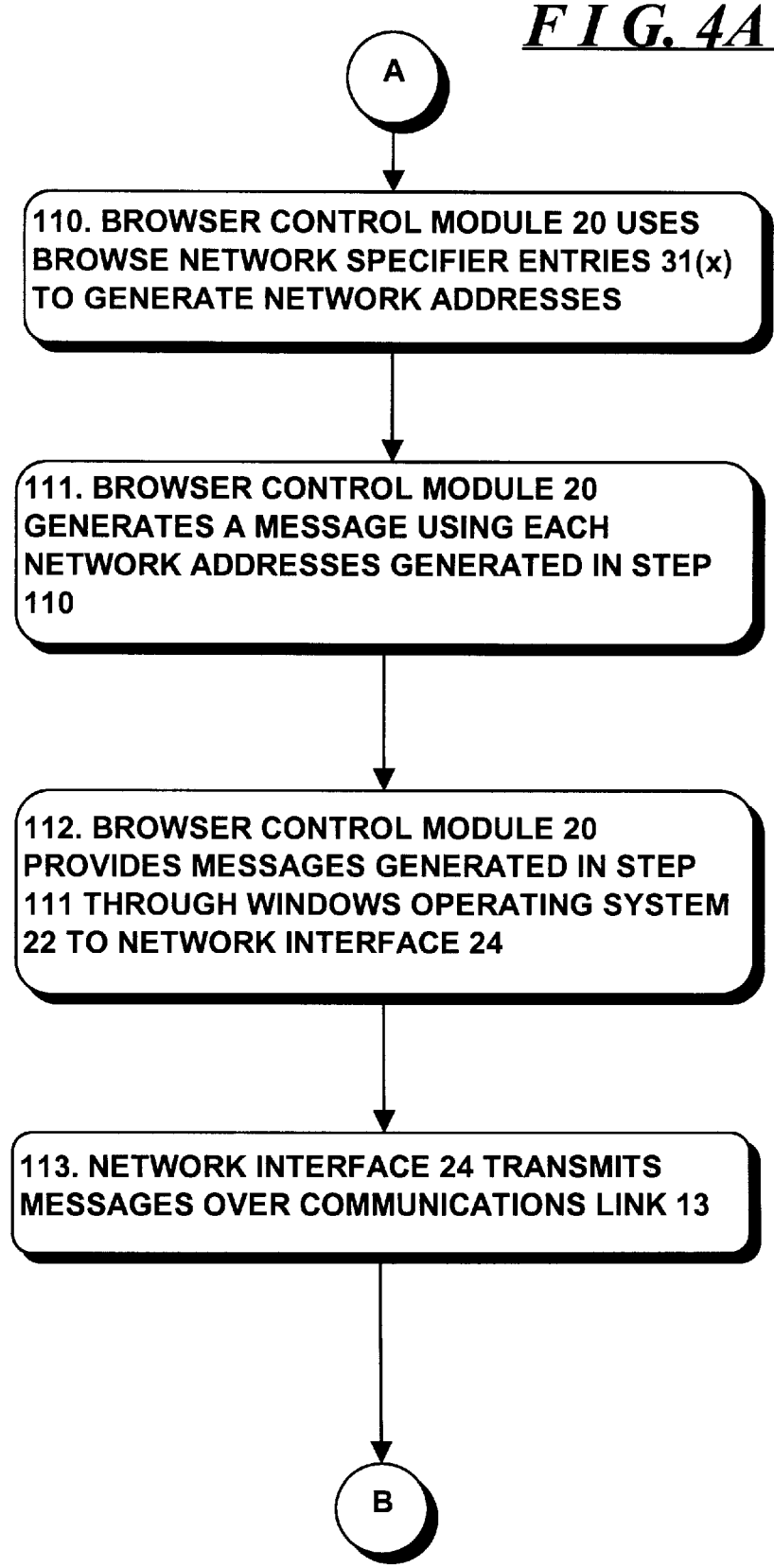

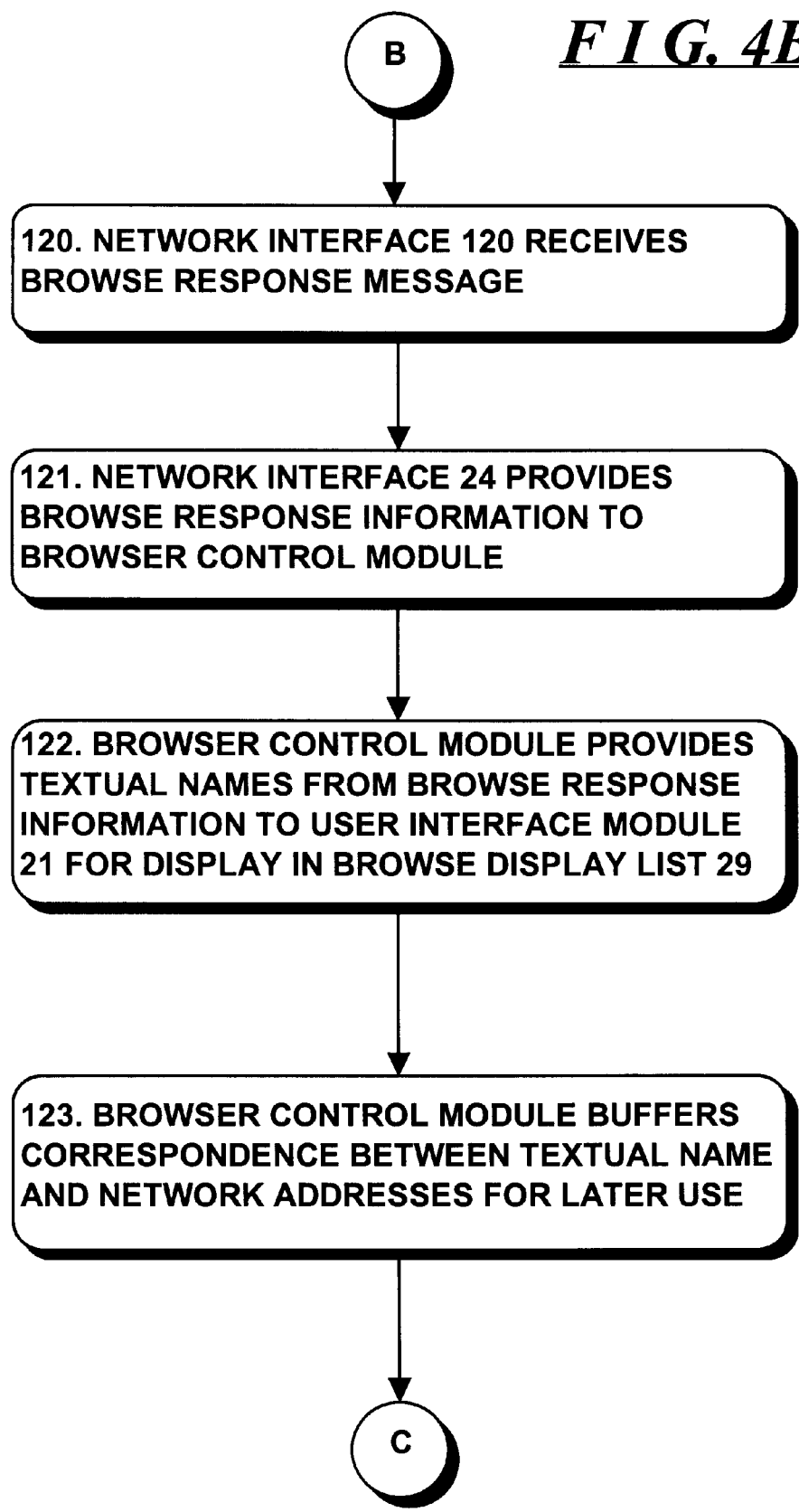

NETWORK BROWSING SYSTEM AND METHOD

INCORPORATION BY REFERENCE

U.S. patent application Ser. No. 08/577,822, filed Dec. 22, 1995, in the names of Joseph E. Provino and Philip M. Rosenzweig, entitled "System And Method For Automounting And Accessing Remote File Systems In Microsoft Windows In A Networking Environment" (hereinafter referred to as "the Provino, et al., application") assigned to the assignee of the present application, incorporated by reference.

FIELD OF THE INVENTION

The invention relates generally to networked digital computer systems, and more particularly provides a network browser system and method for enabling digital computers connected to networks to efficiently "browse" the network, to enable their respective operators to, for example, efficiently identify other computers and other resources which are connected to the network which they may use in their processing.

BACKGROUND OF THE INVENTION

In modern "enterprise" digital data processing systems, that is, computer systems for use in an office environment in a company, a number of personal computers, workstations, and other devices such as mass storage subsystems, network printers and interfaces to the public telephony system, are typically interconnected in a computer network. The personal computers and workstations (generally, "PCs") are used by individual users to perform processing in connection with data and programs that may be stored in the network mass storage subsystems. In such an arrangement, the PCs, operating as clients, access the data and programs from the network mass storage subsystems for processing. In addition, the PCs will enable processed data to be uploaded to the network mass storage subsystems for storage, to a network printer for printing, to the telephony interface for transmission over the public telephony system, or the like. In such an arrangement, the network mass storage subsystems, network printers and telephony interface operate as servers, since they are available to service requests from all of the clients in the network. By organizing the network in such a manner, the servers are readily available for use by all of the PCs the network. Such a network may be spread over a fairly wide area, with the PCs being interconnected by communication links such as electrical wires or optic fibers.

A problem arises when an operator at one PC wishes to determine what other PCs are connected to and available for use over the network, or to determine what other resources are available over the network. For example, an operator of one PC connected to the network may wish to use programs or data which are on other PCs (including both client PCs and server PCs) which are connected to the network, in which case he or she may need to initially obtain the identifications of the particular PCs which are connected to the network. After obtaining the identifications, the operator may retrieve information from or transfer information to their respective information storage systems. The operation by which the operator initially identifies the personal computers, workstations and other resources which are available over the network is typically referred to as "browsing."

Several general methodologies have been used to enable an operator to determine the various PCs and other resources which are available over the network. In one methodology, each PC can be provided with one or more lists of other PCs and other resources which are available to it over the network. In such a case, the list would need to be updated by, for example, a system administrator as each PC or other resource is added to or removed from the network. There are several problems with this methodology. First, maintaining all of the PC/resource lists in an updated condition can be a difficult task, particularly as the size of the network increases and PCs and other resources are added or removed in remote portions of the network. In addition, such lists would normally only identify the particular PCs and resources which are connected to the network, and would not necessarily indicate whether they are available for use at any particular point in time; thus, for example, if a particular PC or other resource is switched off, it would still be identified in a list but would not actually then be available.

In another methodology, each PC or other resource periodically broadcasts "advertising" messages containing their respective identifications over the network, perhaps along with other information such as various types of resources that they may provide which may be accessed over the network. The various PCs can receive the broadcast messages and from the information contained therein can identify the PCs and other resources which broadcast the respective messages. The PCs can buffer the information that they receive in the respective broadcast messages and provide it to the operator when requested. Since new PCs may be added to the network, the PCs and other resources which broadcast the messages will need to broadcast them periodically over the network. In addition, if the PCs receiving the messages determine that they have not received broadcast messages from a particular PC or other resource within a particular time interval, they (that is, the receiving PCs) can determine that the particular PC or other resource has, for example, been turned off or is otherwise no longer available. While this methodology allows each PC to identity other PCs and resources which are available over the network, and maintain the information relatively current, without requiring assistance from a system administrator or other operator, it does require the PCs and other resources to broadcast a number of messages. A number of the broadcast messages may be unnecessary, either because the PCs and other resources which are connected to and available over the network has not changed, or because operators have not requested information as to the PCs and resources which are available over the network. This problem is exacerbated as the number of PCs and other resources which are connected to the network increases, since the number of advertising messages would increase correspondingly and reduce the network bandwidth which is available for transfer of other information over the network. Additionally for networks which are interconnected by devices such as routers, the broadcast advertising messages may not be transferred throughout the entire network, since typically routers are designed so as not to forward broadcast messages.

A further methodology has been developed which alleviates these problems to some extent. In this further methodology, when an operator at a PC wishes to know what other PCs and other resources are available over the network, his or her PC will broadcast an inquiry message over the network. Other PCs and resources connected to the network are to respond to the inquiry message with the required browsing information, including, for example, their respective identifiers, within a particular time-out period. The PC that had broadcast the inquiry message will receive the browsing information can provide the information which it receives during the time-out period to the operator. Generally, to limit the information provided, the broadcast message is responded to only by PCs and other resources within a particular "workgroup" to which the requesting PC has been assigned, so that the information displayed will be only the information for the particular workgroup. While this methodology alleviates the transmission of unnecessary messages which will be broadcast in the previously-described methodology, and it ensures that the information provided to the operator is current, it does have several problems. First, the assignment of PCs and other resources to a particular workgroup may be unduly limiting. In addition, the requirement that a PC or other resource respond within the time-out period in order for its information to be included in the information displayed to the operator, results in information not being included if it is not received within the required time-out period. Thus, if a PC or other resource is busy and not able to respond to the broadcast message within the time-out period, its information will not be provided to the operator even though it may be available for use.

SUMMARY OF THE INVENTION

The invention provides a new and improved network browser system and method for enabling digital computers connected to networks to efficiently "browse" the network, to enable their respective operators to, for example, efficiently identify other computers and other resources which are connected to the network.

In brief summary, the network browser system facilitates browsing of resources in a network, each of the resources having a respective network address. The network browser system includes a browsing control list and a browsing computer. The browsing control list includes at least one network specifier entry that identifies at least a portion of the network, the portion having associated therewith a range of network addresses. The browsing computer is responsive to a browsing request from an operator to initiate a browsing operation in connection with the network. During the browsing operation, the browsing computer generates, from the network specifier entry in the browsing control list, a plurality of browsing request messages that are associated with respective ones of the network addresses in the network address range, and transmits the browsing request messages over the network. The resources in a network whose network addresses correspond to network addresses in the transmitted browsing request messages receive the respective browsing request messages, and transmit in response browsing response messages to the browsing computer. Each browsing response message includes browsing information, such as a name or other textual identifier for the resource, which the browsing computer can display to the operator.

The network browser system provides a number of advantages. For example, the network browser system allows for efficient browsing by the browsing computer without requiring bandwidth-wasting resource advertising messages. Since browsing request and response messages are transmitted only when an operator wishes to browse, the network message traffic required for browsing is substantially reduced, and need not increase correspondingly with the number of computer systems and other resources connected to the network. In addition, the use of the browsing control list to control browsing simplifies regulation of the resources which may be browsed by a particular operator or from a particular portion of the network. The browsing control list need only be updated when a particular network, sub-net, sub-sub-net, etc., is to be added to those which may be browsed by the computers which use the particular browsing control list, or which are to be restricted from browsing. Since these activities would likely occur far less often than, for example, adding or removing a computer system or other resource, which would typically necessitate modification of computer system workgroup lists and the like, the browsing control list is easier to maintain than such workgroup lists.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 4, 4A, 4B, 4C is a flowchart depicting operations performed by the network browsing system.

DETAILED DESCRIPTION OF AN ILLUSTRATIVE EMBODIMENT

Figure 1:
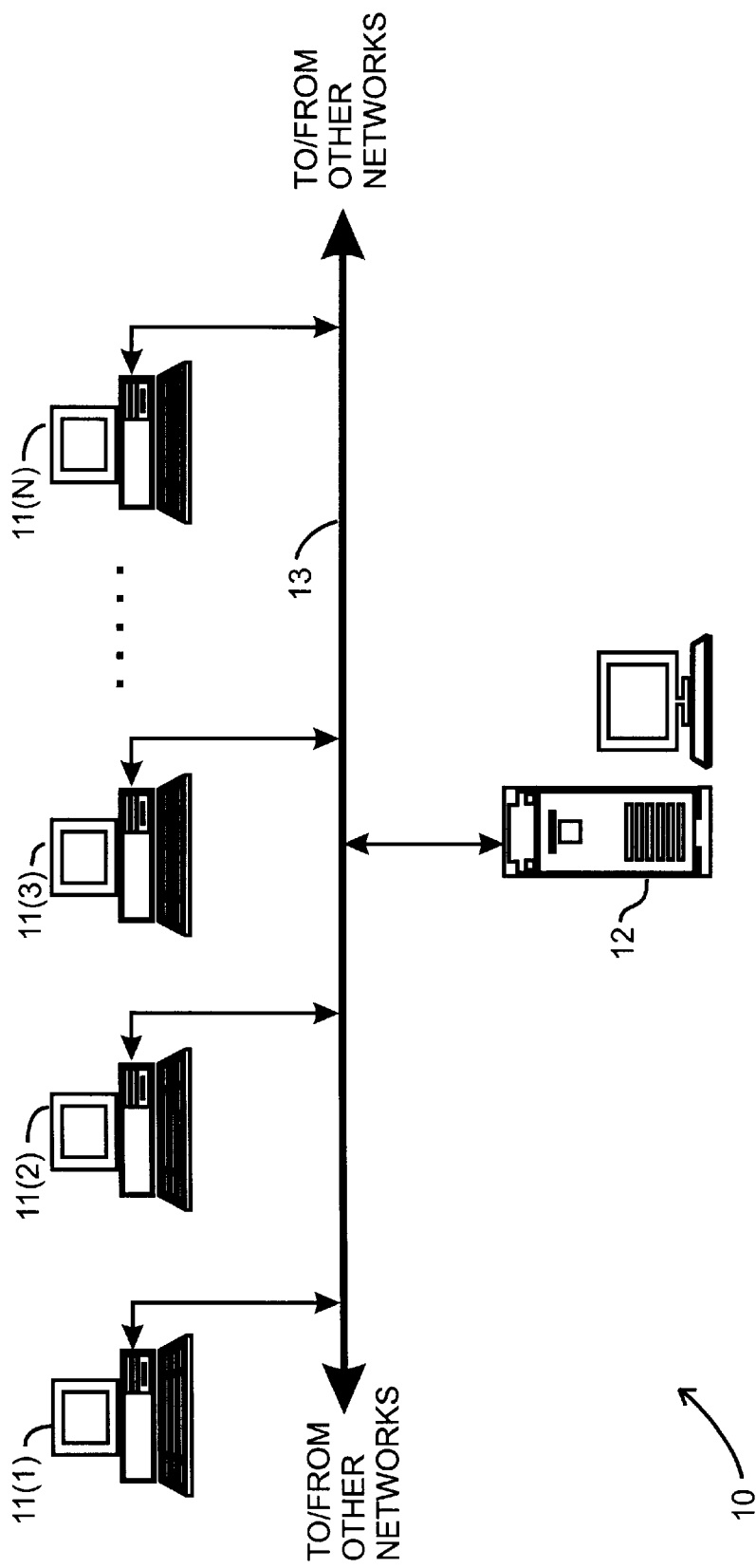
FIG. 1 is a schematic diagram of a computer network including a network browsing system constructed in accordance with the invention.

FIG. 1 depicts a computer network 10 including a network browsing system constructed in accordance with the invention. With reference to FIG. 1, network 10 includes a plurality of computers 11(1) through 11(N) (generally identified by reference numeral 11(n)) and 12 which are interconnected by a communication link 13. As is conventional, the computers 11(n) and 12 are of the conventional stored-program computer architecture. At least some of the computers 11(n) are in the form of personal computers or computer workstations, each of which includes a system unit, a video display unit and operator input devices such as a keyboard and mouse. The computer 12 also includes a system unit, and may also include a video display unit and operator input devices. A system unit generally includes processing, memory, mass storage devices such as disk and/or tape storage elements and other elements (not separately shown), including network interface elements for interfacing the respective computer system 11(n) or server computer 12 to the communication link 13. A video display unit permits the computer to display processed data and processing status to the user, and an operator input device enable the user to input data and control processing by the computer. The computers 11(n) and 12 transfer information, in the form of messages, through their respective network interface devices among each other over the communication link 13. The communication link 13 interconnecting the client computers 11(n) and server computer 12 in the network 10 may, as is conventional, comprise wires, optical fibers or other media for carrying signals representing information among the computers 11(n) and 12.

In one embodiment, the network 10 is organized in a "client-server-" configuration, in which at least one computer, namely, computer 12, operates as a server, and the other computers 11(n) operate as clients. Typically, the servers include large-capacity mass storage devices which can store copies of programs and data which are available for retrieval by the client computers over the communication link 13 for use in their processing operations. From time to time, a client computer system 11(n) may also store data on the server computer 12, which may be later retrieved by it (the client computer that stored the data) or other client computers for use in their processing operations. The server computers may be generally similar to the client computers 11(n), including a system unit, video display unit and operator input devices and may be usable by an operator for data processing operations in a manner similar to a client computer. Alternatively, at least some of the server computers may include only processing, memory, mass storage and network interface elements for receiving and processing retrieval or storage requests from the client computers, and generating responses thereto.

In one particular embodiment, the server computer 12 uses the Microsoft Windows-NT operating system program, and computers 11(n) generally use the Mcrosoft Windows™ operating system program ("Windows"), although they may use the Microsoft Windows-NT operating system instead. Windows and Microsoft Windows-NT provide a number of conventional operating system services in connection with the computers 11(n), including initializing the computers when they are powered-up or reinitialized. In addition, Windows provides a number of conventional operating system services to applications programs that are processed by the computers, including providing a graphical user interface ("GUI").

The network 10 may be connected to a plurality of other networks (not shown), each of which may be structured and organized similarly to network 10. Each network, including network 10, may be divided into a hierarchy comprising a plurality of levels of sections, sub-sections and so forth, which may be illustratively termed "sub-nets," "sub-sub-nets," and so forth. Each computer system 11(n) and server computer 12 is identified by a network address which is structured to reflect the network division hierarchy. For example, each computer system's network address includes a series of one or more high-order portions, which identifies the particular network, sub-net, sub-sub-net, and so for, in the hierarchy, and a low-order portion which provides an identification for the particular computer system 11(n) or server computer 12 in the lowest-level sub-net. Thus, each computer system's network address will have a structure $<a^N_{B_N} \ldots a^N_0 | a^{N-1}_{B_{N-1}} \ldots a^{N-1}_0 | \ldots | a^0_{B_0} \ldots a^0_0>$, where "$a^N_{B_N} \ldots a^N_0$" corresponds to the series of "$B_N$" address bits identifying the network (corresponding to the "N-th" level in the network hierarchy), "$a^{n-1}_{B_{N-1}} \ldots a^{N-1}_0$" corresponds to the series of "$B_{N-1}$" address bits identifying the sub-net (corresponding to the "N-1st" level in the network hierarchy), and "$a^0_{B_0} \ldots a^0_0$" corresponds to the series of "$B_0$" address bits identifying the particular computer system 11(n) or server computer 12 in the lowest level sub-net in the network hierarchy, and the vertical bar "|" indicates that the successive series of address bits are concatenated into a single address. Each level in the hierarchy may be associated with a predetermined number, or a predetermined number, of address bits. Each computer connected to the communication link 13 can transfer information to another computer connected to the communication link by transmitting messages over the communication link 13, and each message includes an address portion which contains the address of the network, sub-net, sub-sub-net, and so forth, as well as the address for the specific computer system 11(n) or server computer 12 connected thereto which is to receive the message.

The invention provides a network browser system for enabling a digital computers, such as a computer system 11(n), connected to the network 10 to efficiently "browse" the network, to enable their respective operators to, for example, efficiently identify other computer systems 11(n') (n'≠n) and various other resources which are connected to the network and available for use by the computer system 11(n). In the embodiment described herein, the network browser system, in addition to determining the identification of other available computers, will also determine the identification of remote file systems which are available to the computer system 11(n), which may be automounted by the automounting arrangement described in the aforementioned Provino, et al. patent application. It will be appreciated that other resources, such as printers, interfaces to various telecommunications systems, and the like, may also be browsed in a manner as the network browser system described herein. The network browser system provides, in graphical and/or textual form, a display list identifying such other computer systems 11(n') (n'≠n) and various other resources, which the operator may use in performing selected operations. For example, using the browse display list, the operator may select a particular computer system 11(n') or resource from which information is to be downloaded for processing by the computer system 11(n), or to which information is to be uploaded for storage, printing, or the like.

In connection with the network browser system, each computer which can perform a browsing operation is associated with a browsing control list, described in detail below in connection with FIG. 3, which identifies networks, subnets, sub-sub-nets and so forth (collectively, "networks and/or portions thereof") which the computer is permitted to browse and provides, for each such network or portion thereof, the high-order portion of the addresses of the respective computers in the network, sub-net, sub-sub-net and so forth. Each computer system 11(n) in a network and/or portion thereof, and each operator who may log-onto and operate a computer system 11(n), may have an individual browsing control list, or a single browsing control list may be provided for an entire network and/or portion thereof.

When the operator of a particular computer system 11(n) wishes to browse the network, network browsing system will retrieve the computer system's browsing control list and use the high-order address portions contained in the browsing control list to generate all of the addresses which may be used within the particular low order portion. That is, for each high-order address portion, each of which may have a low order address portion having the structure "$a^0_{B_0} \ldots a^0_0$" as described above, the computer system 11(n) will generate a series of addresses having all of the various combinations of "$B_0$" address bits in the low order portion, which may identify individual computer systems and other resources connected to the network and/or portion thereof identified by the high-order address portion. If certain combinations of address portions have predetermined functions, such as for use in broadcasting, the computer system 11(n) can ignore those combinations. For each of the addresses so generated, the browsing computer will generate a message for transmission, including the respective address in the message's address portion, and transmit the message over the communication link.

Each computer system 11(n') (n'≠n) that is available over the network (that is, that is connected to the network and currently operating), that has an address corresponding to one in one of the messages (a "browsed computer"), will receive the message transmitted by the computer system 11(n) and will provide a response message, which may include information as to particular resources which are provided by the computer which generated the response message. If the browsing computer system 11(n) does not receive a response message from a browsed computer system 11(n') it can determine that no computer has such an address. The browsing computer system 11(n) can display the browse information received from the computer systems 11(n') as it is received, or alternatively it may assemble the browse information from the response messages which it receives within a predetermined time period and periodically during, or at the end, of the period it may display the assembled browse information to the operator.

Figure 2:
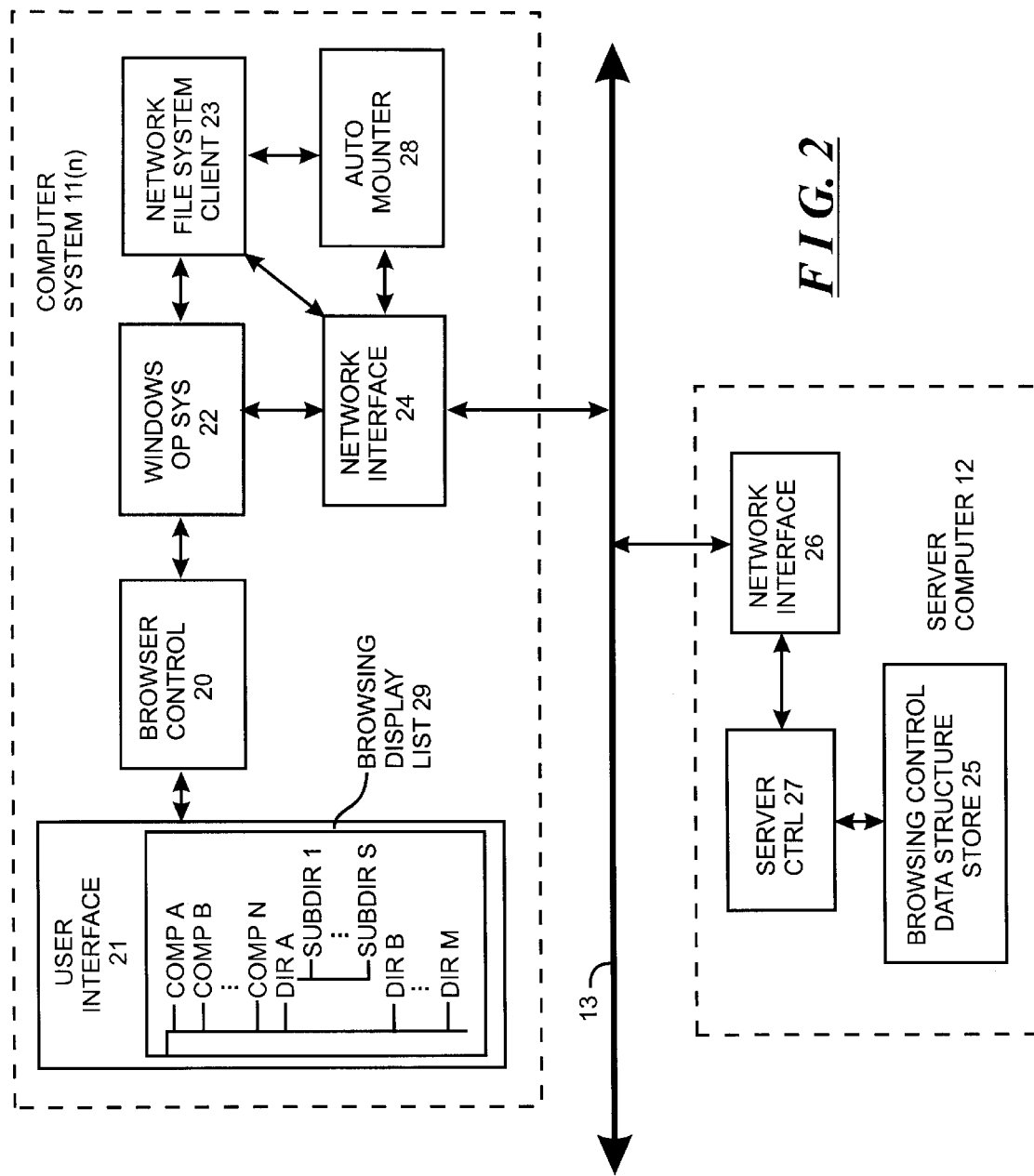
FIG. 2 is a functional block diagram of an individual computer system and a server computer useful in the computer network depicted in FIG. 2.

The network browser system constructed in accordance with the invention will be described in detail in connection with FIGS. 2 through 4. FIG. 2 depicts a functional block diagram of a computer, illustratively one of computers 11(n), which incorporates the network browser system, and the server computer 12 which stores various data structures used by the network browser system. FIG. 3 depicts details of the various data structures which are used by the network browser system, and FIG. 4 depicts a flow chart describing operations performed by the network browser system.

With reference initially to FIG. 2, the network browser system includes a browser control module 20, which receives browsing requests from a user interface module 21. The user interface module 21 may include, for example, conventional user interface elements, such as a video display to display information to the operator, and a keyboard and/or a mouse by which the operator can input information to the computer system 11(n). In connection with browsing, the user interface module 21 can display, for example, a "browse" push-button (not shown) which the operator, using the keyboard or mouse, can actuate to initiate a browsing operation. In response to actuation of the browse push-button, the browser control module 20 will be enabled to control the browsing operation.

In addition to the browser control module 20, several other elements of the computer system 11(n), including the Windows operating system 22, a network file system client module 23, and a network interface module 24, are also used in the browsing operation. The network interface module 24 interfaces the computer system 11(n) to the communication link 13, in particular transmitting messages over and receiving messages from the communication link 13. The network interface module 24 transmits, over the communication link 13, messages received thereby from, for example, the Windows operating system 22 and network file system client module 23. In addition, the network interface module 24 provides information in respective messages received over the communication link 13 to the Windows operating system 22 and network file system client module 23. The Windows operating system 22 generally receives information to be transmitted in a message over the communication link 13 from an application program (not shown) or the browser control module 20, and in addition will generally provide information received in a message over the communication link 13 to an application program or the browser control module 20. If network file system services are to be used, the Windows operating system 22 will make use of the network file system client module 23 in connection with such services.

The network file system client module 23 handles certain message transfers over the network communication link 14, with specific reference to the network browsing system providing browsing control information to the browser control module 20. As will be described below in connection with FIG. 3, the browsing control information is maintained in a browsing control list, identified in FIG. 3 by reference numeral 30, which will include high-order address information for the networks and/or portions thereof which may be browsed by the computer system 11(n), and may also include information used in browsing other resources in the network. If the network file system client module 23 does not have the browsing control information when a request therefor is received from the browser control module 20, it (that is, the network file system client module 23) will enable the network interface module 24 to initiate communications with the server compute 12 to retrieve the browsing control information therefrom.

In one embodiment, the browsing control information is stored in network file system files on the server computer 12, in particular in a browsing control data structure store 25. The server computer 12 further includes a network interface 26 and a server control 27 which enable the server computer to receive browsing control information retrieval request messages from other computers over the communication link 13, retrieve the browsing control information from the browsing control data structure 25, and generate one or more messages to transmit the requested browsing control information to the computer system 11(n). The network interface module 24 will receive the messages from the server computer 12, and provide the browsing control information to the network file system client module 23. After the network file system client module 23 receives the browsing control information from the network interface 24, it can provide the information to the browser control module 20, through the Windows operating system 21.

As indicated above, the browsing control information maintained in browsing control list 30, includes high-order address information for the networks and/or portions thereof which may be browsed by the computer system 11(n), and may also include other addressing information used in browsing other resources in the network. The browser control module 20, using the addressing information from the browsing control list 20, will generate messages using all of the possible addresses for each of the network sub-nets identified by the browsing control information, and provide the messages to the Windows operating system 22 for transmission by the network interface module 24. Each computer system 11(n') (n'≠n) or other resource that is available over a network and/or portion thereof identified in the browsing control information, which receives one of the messages, will provide a browse response message.

The computer system 11(n), in particular the network interface module 24, will receive the browse response messages and provide the browse information contained therein to the Windows operating system 22, which, in turn provides the browse information to the browser control module 20. The browse information provided by the responding computers and other resources preferably includes, along with the network address of the responding computer system's or other resource, information such as a computer or resource name, in textual form, that the browser control module 20 can provide to the user interface module 21 for display to the operator in a browsing display list 29. As each additional browsing response information item is received for particular computer or resource names, the names will be added to the browsing display list 29. As shown in FIG. 2, the browsing display list 29 includes a vertical bar having extending therefrom a vertically-arrayed series of horizontal dashes associated with respective a computer system names "COMP A" through "COMP N" (generally identified by identifier "COMP n"). In addition, other resources are also identified in the browsing display list 29, illustrated in FIG. 2 by directories "DIR A" through "DIR M" (generally identified by identifier "DIR m") which comprise automountable portions of remote file systems, and subdirectories "SUBDIR 1" through "SUBDIR S" (generally identified by identifier "SUBDIR s") in the automountable portion of the remote file system identified by directory DIR A.

It will be appreciated that the computer system 11(n) can continually update the browse information in the browsing display list 29 while the list is displayed by the user interface module 21. Thus, if, for example, a browsing response message is received by the computer system 11(n) from another computer system 11(n') (n'≠n) while the browsing display list 29 is being displayed, the browser control module 20 can enable browse information from the browsing response message to be added to the list 29. Similarly, if the browser control module 20 buffers browsing information for, for example, a selected period, for display in response to a request from the operator during the selected period, if a message is received after the operator has enabled the user interface module 21 to terminate display of the list 29, the browse information can be added to the buffered information.

The computer will also perform operations in connection with browsing for other types of resources available over the network. With reference to browsing of the illustrative remote file system resource, the browsing control list will point to directory and mount point information for remote file systems which are available to the computer system 11(n), including directory and subdirectory names and pointers to remote file systems which may be mounted by the computer system 11(n). Using the mount point information, the in response to a remote file system browsing request from the browser control module 20, network file system client module 23 can enable an automounter module 28 to initiate an automounting operation with a remote file system maintained by another computer system or a server computer 12 connected to the same network or sub-net, or another computer system or server computer 12 connected to a different sub-net or network. In one embodiment, the automounting operation is performed in a similar manner to that described in the aforementioned Provino, et al., patent application.

The operations performed by the computer system 11(n) in connection with a browsing operation will be described in detail in connection with the flow chart in FIG. 4. Before proceeding to FIG. 4, it will be helpful to describe the details of the information contain in the browsing control list 30 used in connection with the network browsing system constructed in accordance with the invention. FIG. 3 depicts a browsing control list used in one embodiment of the network browsing system. With reference to FIG. 3, the browsing control list, which is identified by reference numeral 30, includes a plurality of browse network specify entries 31(1) through 31(X) (generally identified by reference numeral 31(x)). In addition, if the computer system 11(n) is permitted to browse other types of resources, the browsing control list 30 will include one or more "other resource" specify entries; in the particular embodiment in which an "other resource" comprises one or more automountable remote file systems, the browsing control list 30 will also include an automount master map identifier entry 32.

Each browse network specify entry 31(x) identifies a network and the sub-net(s), sub-sub-net(s), and so forth, which the particular computer system 11(n) that uses the browsing control list 30 is permitted to browse. The browse network specific entry 31(x) may comprise a plurality of fields, including a network identifier field 40, and one or more sub-net modifier fields 41(l) through 41(M) (generally identified by reference numeral 41(m)). Each sub-net modifier field 41(m), in turn, may comprise a sub-net exclusion field, such as field 42, and one or more sub-sub-net inclusion fields 43(l) through 43(I) (generally identified by reference numeral 43(i)). The various fields 40, 41(m), 42 and 43(i) generally identify:

(i) at an upper level in the network addressing hierarchy, a particular network, which is identified by a network identifier in the network identifier field 40, in which the computer system 11(n) is permitted to browse, (ii) at a second level in the network addressing hierarchy, particular sub-nets, which are identified by a sub-net identifiers in respective sub-net exclusion fields 42 of the sub-net modifier fields 41(m), for which at least a portion of the sub-net is excluded from browsing by the computer system 11(n), (iii) at a third level in the network addressing hierarchy, particular sub-sub nets, which are identified by the sub-sub-net identifiers in respective sub-sub-net inclusion fields 43(i) in each sub-net modifier field 41(m), of the sub-net identified in the respective sub-net exclusion field 42, which the computer system 11(n) is permitted to browse.

Thus, the fields 40, 41(m), 42 and 43(i), of each entry 31(x) form a nested hierarchy which identifies (i) a particular network for which at least some browsing is permitted, (ii) particular sub-net(s) of the network for which at least some browsing is excluded, and (iii) particular sub-sub net(s) of the respective sub-net(s) for which browsing is permitted. It will be appreciated that the browsing inclusion/exclusion hierarchy for successive nesting levels may be defined by further fields (not shown) in the browsing control list 30.

Figure 3:
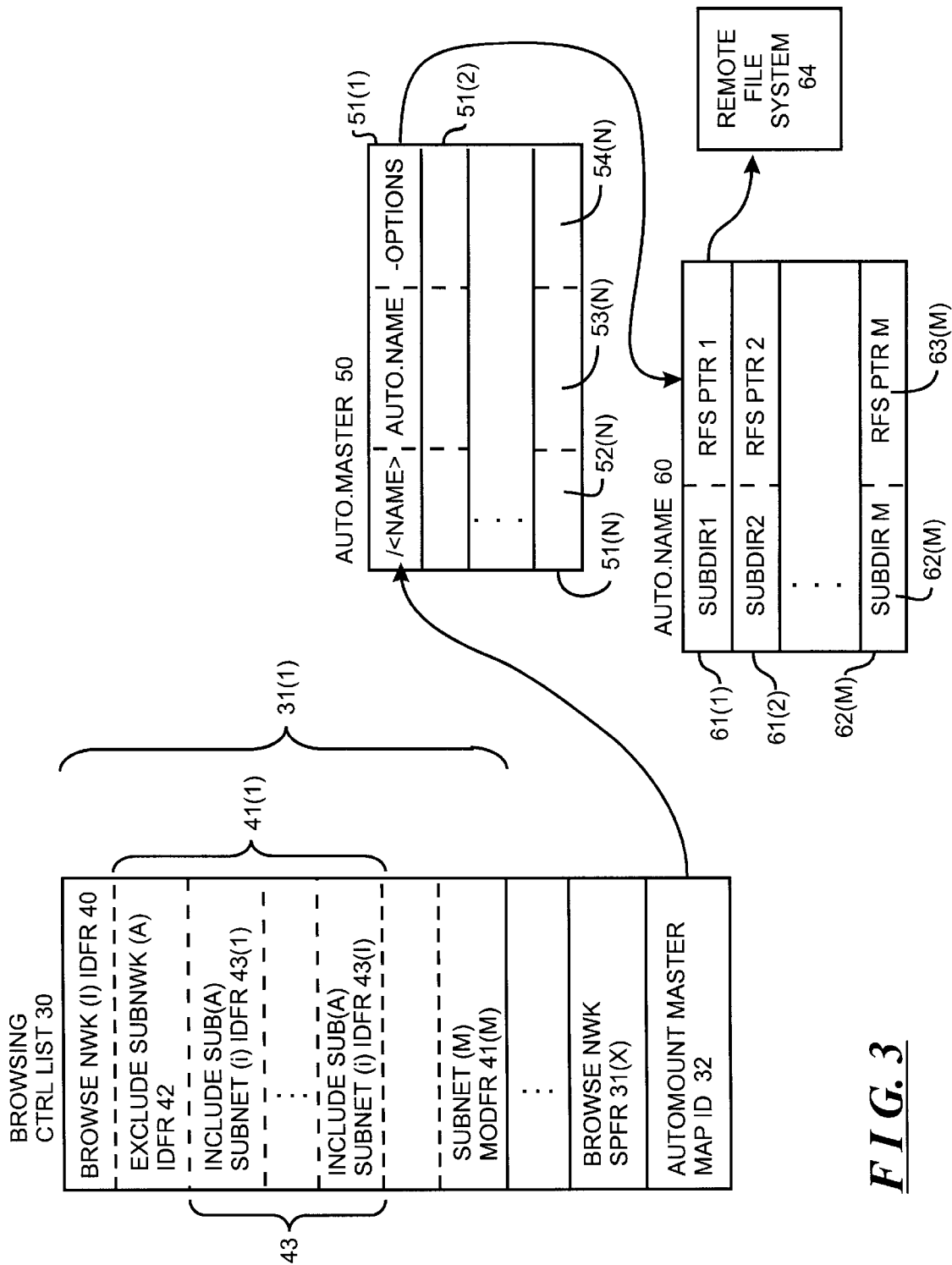
FIG. 3 is a diagram of various data structures useful in connection with the network browsing system.
Figure 4:
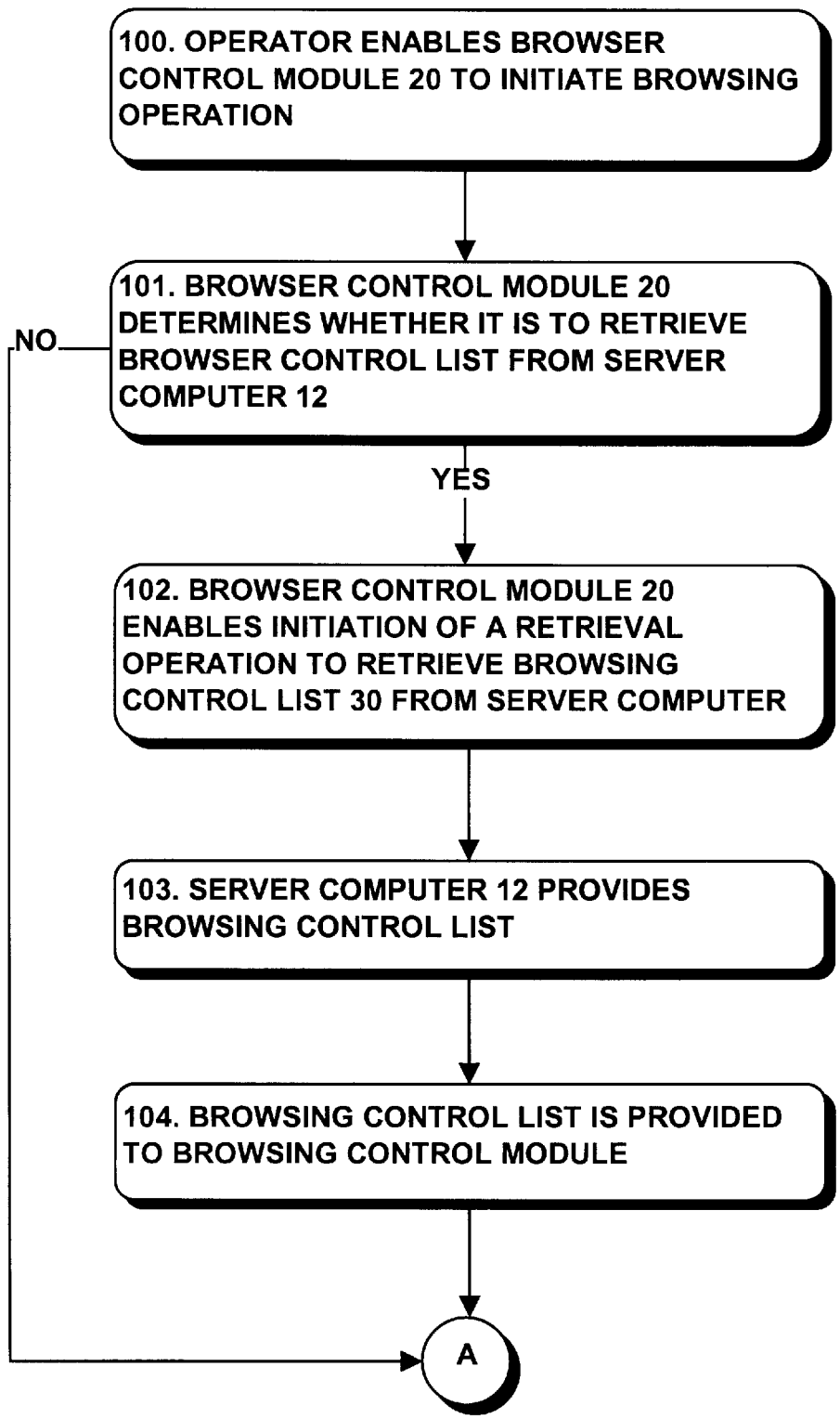
Figure 4C:
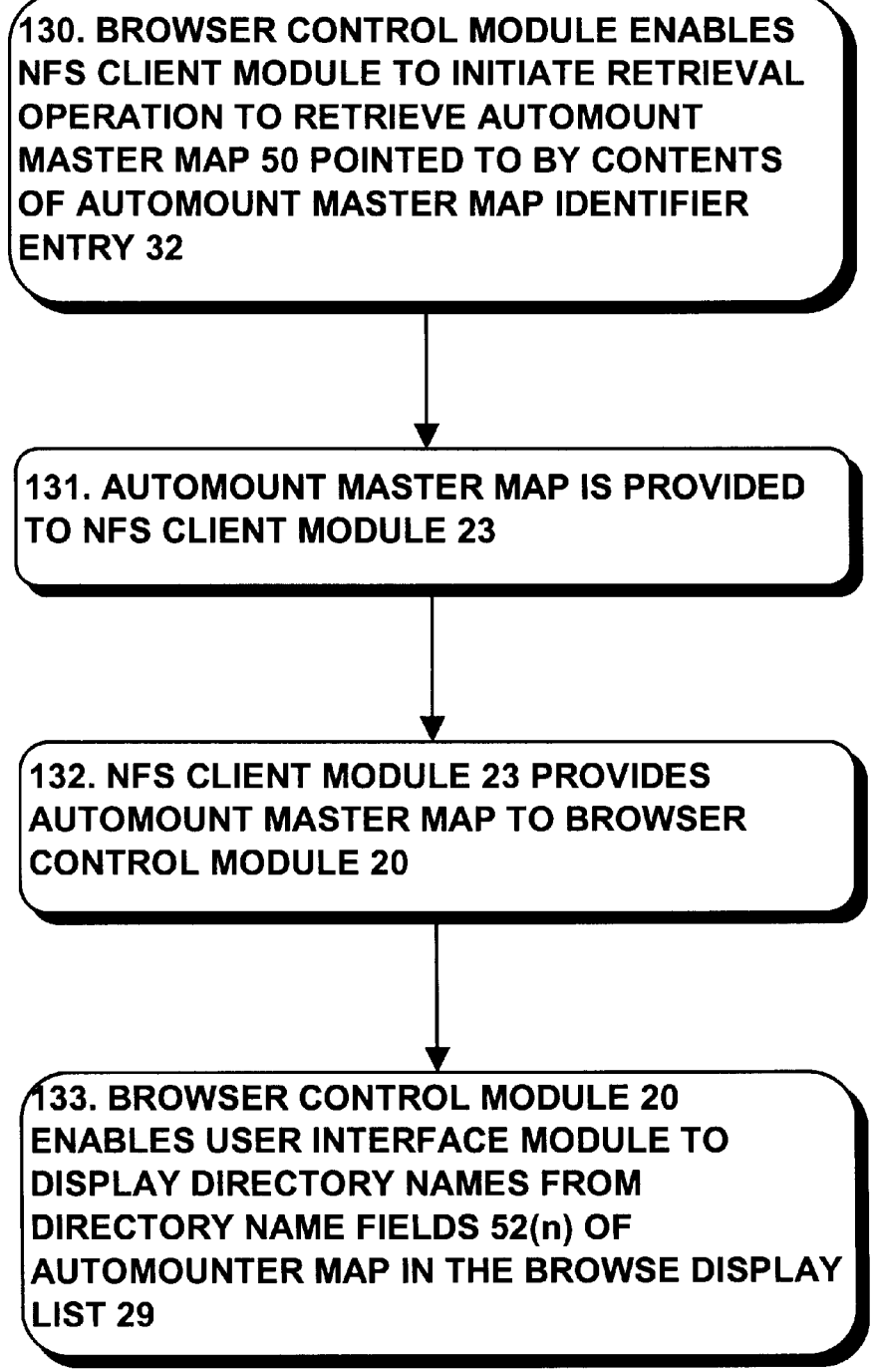

The automount master map file identifier field 32 contains a pointer to a file containing an automount master map, which is identified in FIG. 3 by reference numeral 50. The automount master map contains information which identifies the various file systems that can be automounted and accessed by the computer system 11(n). As shown in FIG. 3, the automount master map 50 includes one or more entries 51(l) through 51(N) (generally identified by reference numeral 51(n)), each of which is associated with a high-level directory in the file system associated with the virtual logical storage device(s). Each entry 51(n) includes a number of fields, including a directory name field (n), an automount subdirectory name field 53(n), and an options field 54(n). Each of the directory name fields 52(n) contains a directory name, which will be used as the name of the topmost directory in a directory tree. Subdirectories under the top level directory, along with pointers to remote file systems, or portions thereof, forming the respective sub-directories, are identified in an automount subdirectory map file identified by reference numeral 60, which will be described below. The automount subdirectory name field 53(n) identifies the automount subdirectory map file 60 that is to be associated with the directory identified in field. The options field 54(n) contains values for a number of optional parameters which may control mounting of the remote file system and accessing of files, including whether the file system can be read, written or both, whether files can be locked, a mount timeout value and a mount attempt retry value, and the like.

As noted above, the automount subdirectory map file 60 identifies the components of the file system under the top level directory. In accordance with one aspect of the invention, an automount subdirectory map file 60 may contain subdirectory identifiers, or alternatively it may contain explicit identifiers for a remote computer system 11(n') (n'≠n) or the server computer 12 and path thereon. If an automount subdirectory map file 60 contains an explicit identifier for a remote computer system 11(*n'*) (n'≠n) or the server computer 12 and path thereon, that may be indicated by an appropriate indication in the options field 54(*n*) of the entry 51(*n*) of the automount master map 50 which points thereto; in one particular embodiment, an option "HOST" is used to identify such a map 60. For those automount subdirectory map files 60 which contain subdirectory names, for each subdirectory, a pointer to a remote file system or portion thereof is provided which forms the respective sub-directory.

The automount subdirectory map file 60 includes a number of entries 61(*l*) through 61(M) (generally identified by reference numeral 61(*m*)) each of which is associated with a subdirectory under the top level directory whose automount subdirectory name field 53(*n*) points to the automount subdirectory map file 60. Each entry 61(*m*) includes two fields, namely, a subdirectory name field 62(*m*) and a remote file system pointer field 63(*m*). The subdirectory name field 62(*m*) contains a subdirectory name which identifies the subdirectory under the top level directory, or the explicit identifier of a remote computer system 11(*n'*) (n'≠n) or the server computer 12 and path thereon. The remote file system pointer field 63(*m*), in turn, contains a pointer to the remote file system, or portion thereof, (identified by reference numeral 64) which is to be mounted for the subdirectory identified in subdirectory name field 62(*m*). Thus, the remote file system pointer field 63(*m*) contains, for example, an identifier of a remote computer system 11(*n'*) (n'≠n) or server computer 12, such as a name or a network address. The automount subdirectory map files 60 that are pointed to by the automounter master map file 50 effectively define the mount points for the virtual logical storage device(s); that is, they define the various subdirectories under the respective directories identified in the automount master map file 50, and in addition identify the particular elements of the remote file systems which comprise the portions of the file system of computer system 11(*n*) mounted at those mount points.

With this background, the details of the operations performed by the network browsing system will be described in connection with FIG. 4. With reference to FIG. 4, when the operator of a particular computer system 11(*n*) wishes to perform a network browsing operation, he or she will enable the browser control module 20 to initiate the network browsing operation in a conventional manner (step 100). In response, the browser control module 20 may first determine whether it is to retrieve the computer's browsing control list 30 from server computer 12 (step 101). The browser control module 20 may, for example, initiate a retrieval of the browsing control list 30 from the server computer 12 each time it performs a browsing operation, in which case it will be assured that the browsing control list 30 that it is using during the browsing operation is current. However, depending on the time required to retrieve the browsing control list 30, this may serve to delay completion of the network browsing operation. On the other hand, since the browsing control list 30 is not likely to change very often, the browser control module 20 may, after it has retrieved the browsing control list 30 during a network browsing operation, buffer the browsing control list 30 for use in connection with subsequent network browsing operations during at least some period of time following the initial network browsing operation, which may reduce the time required to complete a network browsing operation, for at least those operations that are performed after the network browsing operation after the browsing control list 30 is retrieved.

In any case, if the browser control module 20 makes a positive determination in step 101, it will, through the Windows operating system 22, enable the network file system client module 23 to initiate a retrieval operation through the network interface 24 to retrieve the computer's browsing control list 30 from the server computer 12, in particular from the browsing control data structure store 25 (step 102). After the browsing control list 30 has been provided to the network file system client module 23 (step 103), it (that is, the network file system client module 23) will provide the browsing control list 30 to the browser control module 20 (step 104).

Following step 104, or following step 101 if the browser control module 20 makes a negative determination in that step, the browser control module 20 will use the content of the browse network specify entries 31(*x*) from the retrieved or cached browsing control list 30 to generate network addresses (step 110) for the networks, sub-nets, sub-sub-nets, and so forth, that the browsing control list indicates may be browsed by the computer system 11(*n*). In generating the addresses, for each network, sub-net, sub-sub-net, and so forth, that may be browsed by the computer system 11(*n*), the browser control module 20 generates an entire sequence of low-order local address values to append to the address information defined by the browse network specify entries 31(*x*) to generate a complete address. In addition, for each such complete address so generated, the browser control module 20 generates a browse request message for transmission over the communication link 13 (step 111). The browser control module 20 provides the browse request messages generated in step 111 through the Windows operating system 22 to the network interface 24 (step 112), which, in turn, transmits the messages over the communication link 13.

Thereafter, the browser control module 20 will wait for browse response information in browse response messages transmitted by other computer systems 11(*n'*) (n'≠n) in response to the browse request messages transmitted in step 112. In particular, when the network interface 24 receives a browse response message (step 120), it (that is, the network interface 124) will provide the browse response information from the browse response message to the browser control module 20 (step 121). As indicated above, the browse response information will include a textual name for the computer system 11(*n'*), in addition to the network address of the computer system 11(*n'*) which generated the browse response message. The browser control module 20 provides the textual names to the user interface module 21 for display (step 122). In addition, the browser control module 20 buffers the correspondence between the textual name and the network address (step 123) for later use if the operator selects the textual name of the computer system 11(*n'*) as displayed by the user interface module 21. Steps 120 through 123 will be repeated for each browse response message received by the network interface 24.

In addition, the browser control module 20 will enable the user interface module 21 to display mount point information obtained from the automount master map 50 which is pointed to by the automount master map identifier entry 32 of the browsing control list 30, and the automount subdirectory map files 60, if any, that are pointed to by the automount master map 50. In that operation, the browser control module 20, through the Windows operating system 22, enables the network file system client module 23 to initiate a retrieval operation through the network interface 24 to retrieve the computer's automount master map 50, pointed to by the contents of the automount master map identifier entry 32 (step 130). After the automount master map 50 has been provided to the network file system client module 23 (step 131), it (that is, the network file system client module 23) will provide the automount master map 50 to the browser control module 20 (step 132). The browser control module 20, in turn, will provide enable the user interface module 21 to display the directory names from the directory name fields 52(n) of the automount master map 50 in the browse display (step 133).

It will be appreciated that the computer system 11(n) can perform steps 130 through 133 to retrieve the automount master map 50 and display the directory names therefrom concurrently with the operations described above in connection with steps 110 through 112 and 120 through 123. In addition, the browser control module 20 can enable the user interface module 21 to display the browse information, that is, the computer system names obtained from the respective computer systems 11(n') (n'≠n) in steps 120 through 123 and the directory names obtained from the automount master map 50, as it (that is, the browser control module 20) receives the respective computer system names and automount master map 50.

After the user interface module 21 has displayed the browsing display list 29, the operator may select any of the items listed in the browsing display list 29. If, for example, the operator selects a computer system name "COMP n" in the browsing display list 21, the browser control module 20 of the computer system 11(n) will obtain from the computer system 11(n') (n'≠n) selected browsing information, which it (that is, the browser control module 20) will enable the user interface module 21 to display in the browsing display list 29. In that operation, the browser control module 20, through the Windows operating system 22, will enable the network file system client module 23 to initiate an exchange of messages over the communication link 13 with the computer system 11(n') (n'≠n) associated with the selected name, to enable the computer system 11(n') to provide the computer system 11(n) with the selected browsing information. The selected browsing information may be any of a number of types of information, including, for example, information regarding portions of the file system of the computer system 11(n') which the computer system 11(n) may access over the network, identification of printers which the computer system 11(n) may access through the computer system 11(n'), and the like. When the network file system client module 23 receives the selected browsing information from the computer system 11(n'), it (that is, the network file system client module 23) will provide the information to the browser control module 20, which, in turn, will enable the user interface module 21 to display the selected browsing information in the browsing display list 29.

In addition, if the operator selects a directory name "DIR m" from the browsing display list 29, the browser control module 20 will obtain from the server computer 12 the identification of the subdirectories under the directory associated with the selected directory name. As described above, the subdirectory names for each directory DIR m identified in the automount master map 50 listed in the browsing display list 29 are, in turn, identified in the automount subdirectory map file 60 that is pointed to by the directory's entry 51(n) in the automount master map 50. The subdirectories that are listed in the browsing display list 29 may include identifiers for one or more remote computer systems if the directory selected by the operator is associated with an entry 51(n) of the automount master map 50 that is, in turn, associated with the "HOST" option as described above. The automount subdirectory map files 60 for the computer system 11(n) are, in one embodiment, normally stored on the server computer 12.

Accordingly, to obtain the identification of the subdirectories, including remote computer system identifiers, for the selected entry, the browser control module 20 will obtain the pointer for the automount subdirectory map file pointed to by the entry 51(l) of the automount master map 50 for the selected directory DIR m. Thereafter, the browser control module 20, through the Windows operating system 22, will enable the network file system client module 23 to initiate an exchange of messages over the communication link 13 with the server computer 12 to enable the server computer to provide the computer system 11(n) with the automount subdirectory map file 60 identified by the pointer. When the network file system client module 23 receives the automount subdirectory map file 60 from the server computer 12, it (that is, the network file system client module 23) will provide the information to the browser control module 20, which, in turn, will enable the user interface module 21 to display the subdirectory information in the browsing display list 29. The subdirectory information for directory DIR A is illustratively shown in the browsing display list 29 as "SUBDIR 1" . . . "SUBDIR S." Similar subdirectory information may be obtained and displayed for other directories DIR B . . . DIR M in a similar manner.

The network browsing system in accordance with the invention provides a number of advantages. For example, the network browsing system allows for efficient browsing by a computer system 11(n) connected in the network 10, without requiring bandwidth-wasting resource advertising messages. As indicated above, if each computer system and resource connected to a resource periodically broadcasts a resource advertising message, as the numbers of computer system and the resources increases, the amount of network bandwidth which is devoted to the resource advertising message will correspondingly increase. Since with the network browsing system in accordance with the invention, messages are exchanged only when an operator wishes to browse, the network message traffic required for browsing is substantially reduced, and need not increase correspondingly with the number of computer systems and other resources connected to the network.

In addition, the use of the browsing control list 30 to control browsing simplifies regulation of the computer systems and other resources which may be browsed by a particular operator or from a particular portion of the network. The browsing control list 30 need only be updated when a particular network, sub-net, sub-sub-net or other element is to be added to those which may be browsed by the computer systems which use the particular list 30, or which are to be restricted from browsing. Since these activities would likely occur far less often than, for example, adding or removing a computer system or other resource, which would typically necessitate modification of computer system workgroup lists and the like, the browsing control list 30 is easier to maintain than such workgroup lists.

It will be appreciated that a number of modifications may be made to the network browsing system in accordance with the invention. For example, a single browsing control list 30 may be used for all of the computer systems 11(n) connected in the network 10, or separate browsing control lists may be provided for some or each of the computer systems. In addition, it will be appreciated that the various types of resources which may be browsed may differ from the resources which are specifically described herein.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A network browser system for facilitating browsing of a network, the network browser system comprising:
    A. a browsing control list including at least one network specifier entry identifying at least a portion of a network having associated therewith a network address range comprising at least one network address; and
    B. a browsing computer responsive to a browsing request from an operator for performing a browsing operation in connection with said network, the browsing computer during said browsing operation generating from the at least one network specifier entry a browsing request message associated with each network address in said network address range for transmission over said network, the browsing computer receiving at least one browsing response message from said network and displaying browsing information provided thereby to the operator.

2. A network browser system as defined in claim 1 in which the network comprises a plurality of computers, including said browsing computer, all of which are interconnected by a communication link.

3. A network browser system as defined in claim 2 in which said browsing control list is stored in a browsing control list store on one of said plurality of computers.

4. A network browser system as defined in claim 3 in which one of said plurality of computers comprises a server computer, said server computer providing said browsing control list store.

5. A network browser system as defined in claim 2 in which each of said plurality of computers that receives a browsing request message generates one of said browsing response messages, each said browsing response message including said browsing information.

6. A network browser system as defined in claim 2 in which each of said plurality of computers is associated with a network identifier, each of said plurality of computer including its network identifier in its browsing information in its respective browsing response message.

7. A network browser system as defined in claim 1 in which said network comprises a plurality of sub-networks, each having associated therewith respective network address ranges, said at least one network specifier including at least one sub-network modifier field identifying one of said plurality of sub-networks to be excluded from browsing, the browsing computer not generating browsing request messages for the network address range associated with said one of said plurality of sub-networks.

8. A network browser system as defined in claim 7 in which at least one of said plurality of sub-networks further includes a plurality of sub-sub-networks, each associated with respective portions of the network address range that is associated with the at least one of said plurality of sub-networks, said at least one sub-network modifier field identifying one of said plurality of sub-sub-networks to be included in browsing, the browsing computer generating browsing request messages for the network address range associated with said one of said plurality of sub-sub-networks.

9. A network browser system as defined in claim 1 in which said browsing control list includes a plurality of network specifier entries, respective network specifier entries identifying at least a portion of respective ones of a plurality of interconnected networks each having associated therewith a respective network address range, the browsing computer generating a plurality of browsing request messages associated with said network addresses in said respective network address ranges.

10. A network browser system as defined in claim 1 in which said browsing control list further references network resource identification information identifying at least one resource that is available for use by the browsing computer, the browsing computer further displaying said network resource identification information to said operator during said browsing operation.

11. A network browser system as defined in claim 10 in which said network resource identification information is stored in a network resource identification list pointed to by said browsing control list.

12. A network browser system as defined in claim 10 in which at least one resource comprises a remote file system characterized by at least one directory, the network resource identification information including a directory name for said at least directory, the browsing computer displaying said directory name to said operator during said browsing operation.

13. A network browser system as defined in claim 12 in which said network resource identification information further includes a pointer to said remote file system, the browsing computer further including an automounter for automounting said remote file system in response to selection of said displayed directory name by said operator.

14. A network browsing method for facilitating browsing by a browsing computer of a network, the network browser system comprising:
    A. providing a browsing control list including at least one network specifier entry identifying at least a portion of a network having associated therewith a network address range comprising at least one network address; and
    B. enabling a browsing computer, in response to a browsing request from an operator for performing a browsing operation in connection with said network, to
        (i) generate from the at least one network specifier entry a browsing request message associated with each network address in said network address range for transmission over said network, and
        (ii) receive at least one browsing response message from said network and display browsing information provided thereby to the operator.

15. A network browsing method as defined in claim 14 in which the network comprises a plurality of computers, including said browsing computer, all of which are interconnected by a communication link.

16. A network browsing method as defined in claim 15 in which said browsing control list is stored in a browsing control list store on one of said plurality of computers, the method further including the step of enabling said browsing computer to obtain said browsing control list.

17. A network browsing method as defined in claim 16 in which one of said plurality of computers comprises a server computer, said server computer providing said browsing control list store.

18. A network browsing method as defined in claim 15 further including the step of enabling each of said plurality of computers that receives a browsing request message to generate one of said browsing response messages, each said browsing response message including said browsing information.

19. A network browsing method as defined in claim 15 in which each of said plurality of computers is associated with a network identifier, each of said plurality of computer being enabled to include its network identifier in its browsing information in its respective browsing response message.

20. A network browsing method as defined in claim 14 in which said network comprises a plurality of sub-networks, each having associated therewith respective network address ranges, said at least one network specifier including at least one sub-network modifier field identifying one of said plurality of sub-networks to be excluded from browsing, the browsing computer not generating browsing request messages for the network address range associated with said one of said plurality of sub-networks.

21. A network browsing method as defined in claim 20 in which at least one of said plurality of sub-networks further includes a plurality of sub-sub-networks, each associated with respective portions of the network address range that is associated with the at least one of said plurality of sub-networks, said at least one sub-network modifier field identifying one of said plurality of sub-sub-networks to be included in browsing, the browsing computer being enabled to generate browsing request messages for the network address range associated with said one of said plurality of sub-sub-networks.

22. A network browsing method as defined in claim 14 in which said browsing control list includes a plurality of network specifier entries, respective network specifier entries identifying at least a portion of respective ones of a plurality of interconnected networks each having associated therewith a respective network address range, the browsing computer being enabled to generate a plurality of browsing request messages associated with said network addresses in said respective network address ranges.

23. A network browsing method as defined in claim 14 in which said browsing control list further references network resource identification information identifying at least one resource that is available for use by the browsing computer, the browsing computer being further enabled to display said network resource identification information to said operator during said browsing operation.

24. A network browsing method as defined in claim 23 in which said network resource identification information is stored in a network resource identification list pointed to by said browsing control list.

25. A network browsing method as defined in claim 23 in which at least one resource comprises a remote file system characterized by at least one directory, the network resource identification information including a directory name for said at least directory, the browsing computer being enabled to displaying said directory name to said operator during said browsing operation.

26. A network browser system as defined in claim 15 in which said network resource identification information further includes a pointer to said remote file system, the browsing computer further being enabled to automount said remote file system in response to selection of said displayed directory name by said operator.

27. A network browsing system computer program product for controlling a browsing computer to browse a network, the network browser system computer program product comprising a computer-readable medium having encoded thereon:

A. browsing control list code devices for enabling said browsing computer to obtain a browsing control list, said browsing control list including at least one network specifier entry identifying at least a portion of a network having associated therewith a network address range comprising at least one network address; and B. browse enabling code devices for enabling the browsing computer, in response to a browsing request from an operator for performing a browsing operation in connection with said network, the browsing computer during said browsing operation generating from the at least one network specifier entry a browsing request message associated with each network address in said network address range for transmission over said network, and to enable the browsing computer to receive at least one browsing response message from said network and display browsing information provided thereby to the operator.

28. A network browser system computer program product as defined in claim 27 in which the network comprises a plurality of computers, including said browsing computer, all of which are interconnected by a communication link.

29. A network browser system computer program product as defined in claim 28 in which said browsing control list is stored in a browsing control list store on one of said plurality of computers.

30. A network browser system computer program product as defined in claim 29 in which one of said plurality of computers comprises a server computer, said server computer providing said browsing control list store.

31. A network browser system computer program product as defined in claim 28 in which each of said plurality of computers that receives a browsing request message generates one of said browsing response messages, each said browsing response message including said browsing information.

32. A network browser system computer program product as defined in claim 28 in which each of said plurality of computers is associated with a network identifier, each of said plurality of computer including its network identifier in its browsing information in its respective browsing response message.

33. A network browser system computer program product as defined in claim 27 in which said network comprises a plurality of sub-networks, each having associated therewith respective network address ranges, said at least one network specifier including at least one sub-network modifier field identifying one of said plurality of sub-networks to be excluded from browsing, the browsing enabling code devices disabling said browsing computer from generating browsing request messages for the network address range associated with said one of said plurality of sub-networks.

34. A network browser system computer program product as defined in claim 33 in which at least one of said plurality of sub-networks further includes a plurality of sub-sub-networks, each associated with respective portions of the network address range that is associated with the at least one of said plurality of sub-networks, said at least one sub-network modifier field identifying one of said plurality of sub-sub-networks to be included in browsing, the browsing enabling code devices enabling said browsing computer to generate browsing request messages for the network address range associated with said one of said plurality of sub-sub-networks.

35. A network browser system computer program product as defined in claim 27 in which said browsing control list includes a plurality of network specifier entries, respective network specifier entries identify at least a portion of respective ones of a plurality of interconnected networks each having associated therewith a respective range of network addresses, the browsing enabling code devices enabling said browsing computer to generate a plurality of browsing request messages associated with said network addresses in said respective ranges.

36. A network browser system computer program product as defined in claim 27 in which said browsing control list further references network resource identification information identifying at least one resource that is available for use by the browsing computer, the browsing enabling code devices enabling said browsing computer to further display said network resource identification information to said operator during said browsing operation.

37. A network browser system computer program product as defined in claim 36 in which said network resource identification information is stored in a network resource identification list pointed to by said browsing control list, the browsing enabling code devices enabling said browsing computer to retrieve said network resource identification list.

38. A network browser system computer program product as defined in claim 36 in which at least one resource comprises a remote file system characterized by at least one directory, the network resource identification information including a directory name for said at least directory, the browsing enabling code devices enabling said browsing computer to display said directory name to said operator during said browsing operation.

39. A network browser system computer program product as defined in claim 38 in which said network resource identification information further includes a pointer to said remote file system, the network browser system computer program product further including automounter code devices for enabling said computer to automount said remote file system in response to selection of said displayed directory name by said operator.

40. A network browser system comprising:
A. a browsing computer, and
B. a control subsystem for said browsing computer to browse a network, control subsystem comprising:
   i. browsing control list code devices for enabling said browsing computer to obtain a browsing control list, said browsing control list including at least one network specifier entry identifying at least a portion of a network having associated therewith a network address range comprising at least one network address; and
   ii. browse enabling code devices for enabling the browsing computer, in response to a browsing request from an operator for performing a browsing operation in connection with said network, the browsing computer during said browsing operation generating from the at least one network specifier entry a browsing request message associated with each network address in said network address range for transmission over said network, and to enable the browsing computer to receive at least one browsing response message from said network and display browsing information provided thereby to the operator.

41. A control subsystem for use in connection with a browsing computer, the control subsystem enabling said browsing computer to browse a network, control subsystem comprising:
A. browsing control list code devices for enabling said browsing computer to obtain a browsing control list, said browsing control list including at least one network specifier entry identifying at least a portion of a network having associated therewith a network address range comprising at least one network address; and
B. browse enabling code devices for enabling the browsing computer, in response to a browsing request from an operator for performing a browsing operation in connection with said network, the browsing computer during said browsing operation generating from the at least one network specifier entry a browsing request message associated with each network address in said network address range for transmission over said network, and to enable the browsing computer to receive at least one browsing response message from said network and display browsing information provided thereby to the operator.

\* \* \* \* \*